(12) United States Patent
Haversat

(10) Patent No.: US 6,485,221 B1
(45) Date of Patent: Nov. 26, 2002

(54) UNIVERSAL CLAMP FOR MODULAR DISPLAY SYSTEM

(75) Inventor: Mark A. Haversat, Monroe, CT (US)

(73) Assignee: Canfield Industries, Inc., Bridgeport, CT (US)

( * ) Notice: Subject to any disclaimer, the term of this patent is extended or adjusted under 35 U.S.C. 154(b) by 5 days.

(21) Appl. No.: 09/596,701

(22) Filed: Jun. 19, 2000

(51) Int. Cl.[7] ................................................. F16B 7/00
(52) U.S. Cl. ........................ 403/373; 403/255; 403/188
(58) Field of Search ............................ 405/373, 374.1, 405/374.2, 374.3, 188, 187, 256, 257

(56) References Cited

U.S. PATENT DOCUMENTS

| | | |
|---|---|---|
| 3,349,427 A | 10/1967 | Cairns et al. |
| 3,677,322 A | 7/1972 | Brorson et al. |
| 4,190,375 A * | 2/1980 | Berry ..................... 403/187 X |
| 4,662,128 A | 5/1987 | Eberdt et al. |
| 4,864,691 A | 9/1989 | Gidseg et al. |
| 4,982,535 A | 1/1991 | Pickett |
| 5,107,639 A | 4/1992 | Morin et al. |
| 5,425,157 A | 6/1995 | Chang |
| 5,857,510 A | 1/1999 | Krupke et al. |
| 5,875,600 A * | 3/1999 | Redman ................ 403/257 X |
| 6,179,510 B1 * | 1/2001 | Meicke et al. ......... 403/256 X |
| 6,290,426 B1 * | 9/2001 | van Gijsel et al. ....... 403/374.3 |

* cited by examiner

Primary Examiner—Lynne H. Browne
Assistant Examiner—John R. Cottingham
(74) Attorney, Agent, or Firm—DeLio & Peterson, LLC

(57) ABSTRACT

A universal clamp for attaching display fixtures to a slot in a hollow vertical column support of a modular display system includes a body piece having an axial opening therein, an elongated clamping piece that extends through the body piece and has an enlarged head at one end, and a clamping actuator at an opposite end of the clamping piece to draw the enlarged head into clamping engagement with the column. The head of the clamping piece has a height H greater than the width of the slot in the vertical column and a width W less than the width of the slot. The clamp is rotated ninety degrees to allow the head of the clamping piece to enter the column through the slot, then turned back ninety degrees to engage the head with the column before clamping. A curved face on the body piece matches the curved outer surface of the column and a ridge across the curved face engages the slot to prevent the clamp from rotating around its own axis during clamping. The clamping actuator is preferably a knob threadedly attached to a threaded end of the clamping piece. The clamping piece has a portion with a non-circular cross section to keep the body piece aligned relative to the head of the clamping piece.

10 Claims, 2 Drawing Sheets

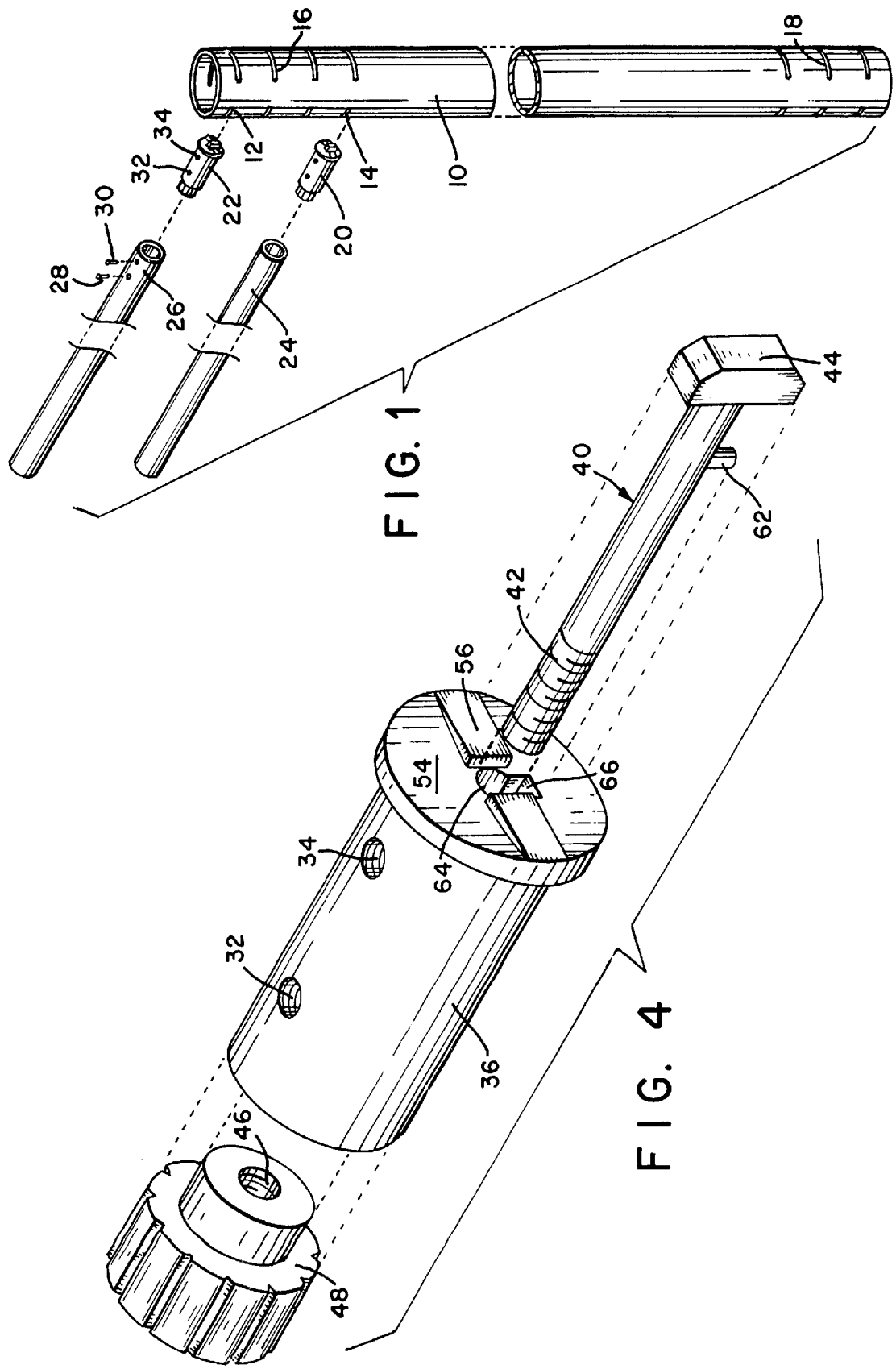

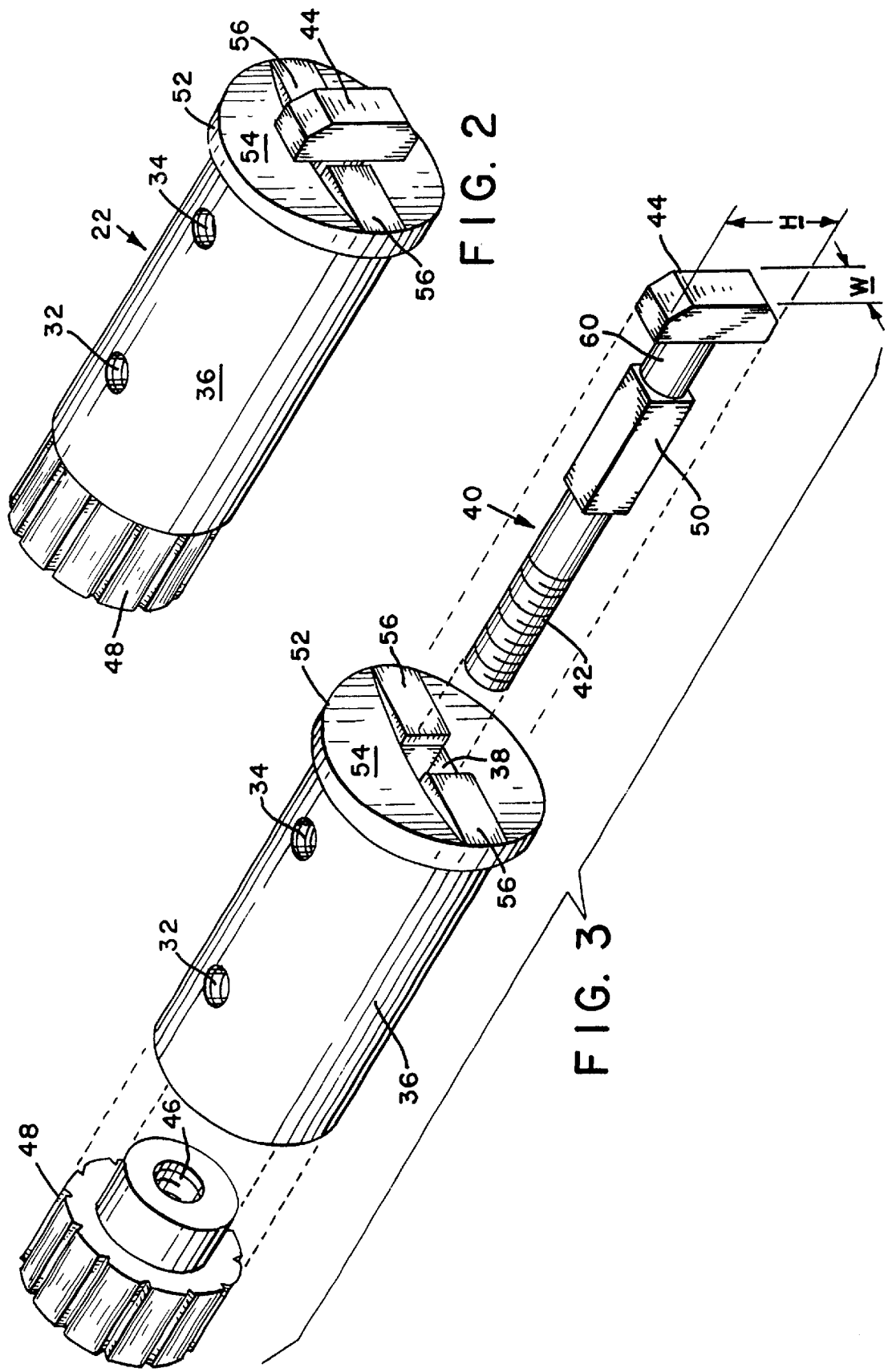

UNIVERSAL CLAMP FOR MODULAR DISPLAY SYSTEM

BACKGROUND OF THE INVENTION

1. Field of the Invention

This invention relates to devices for attaching display fixtures to display systems of the type commonly used at trade shows, conventions and in public areas to display goods or offer services for sale. More specifically, this invention relates to clamps used to make connection to vertical supports in such display systems so that horizontal supports, shelves, lights and other display fixtures can be quickly attached to the vertical supports.

2. Description of Related Art

Trade shows and conventions have become an important avenue for introducing new products and services to potential customers. Vendors have a need for a reliable display system that can be quickly assembled and disassembled to establish a display area. A suitable display system is seen in U.S. patent application Ser. No. 09/325,816, filed Jun. 4, 1999 and assigned to Canfield Industries, Inc. of Bridgeport Conn., the owner of the present invention. The disclosure of that application is incorporated herein by reference.

The display system described therein includes vertical columns having a series of spaced horizontal slots used for attaching horizontal supports, lights, shelves and other display fixtures needed in the display area. Previous methods of making connection to the vertical columns of the display system have not been completely satisfactory. Some methods of attachment have required numerous, separate components to make the attachment. When multiple pieces are used to make the connection, the pieces may become separated after the display system is disassembled, making it difficult to reassemble at a new location.

Prior art attachment devices have also been relatively slow to assemble and connect to the vertical supports. Thus they have not fully met the need for rapid assembly—which is highly desirable when a display must be reassembled at each new location. Accordingly, previous methods of making connection to the vertical columns of the display system have not met the need for a single interchangeable universal clamp that can be quickly attached by hand and which provides a secure, non-rotating attachment point.

Bearing in mind the problems and deficiencies of the prior art, it is therefore an object of the present invention to provide a universal clamp for a modular display system that can be quickly attached by hand.

It is another object of the present invention to provide a universal clamp for a modular display system which provides a connection that can be rotated around the axis of a vertical column support and then clamped into positions at a desired angular orientation.

Yet another object of the present invention is to provide a universal clamp for a modular display system that includes threaded connection points located at a fixed orientation to vertical when the clamp is attached.

A further object of the invention is to provide a universal clamp for a modular display system that remains in a single piece when disconnected to reduce the possibility of losing parts when the clamp is not attached and is being transported to another trade show.

Still another object of the present invention is to provide a clamp for a modular display system that is universal and can be used for connecting any desired type of display fixture to vertical column supports.

Still other objects and advantages of the invention will in part be obvious and will in part be apparent from the specification.

SUMMARY OF THE INVENTION

The present invention comprises a universal clamp for attaching display fixtures to a slot in a hollow vertical column support of a modular display system. The clamp includes a body piece having an opening therein, an elongated clamping piece extending through the opening in the body piece, and a clamping actuator.

The clamping piece preferably has threads at one end and an enlarged head at the opposite end. The enlarged head has a dimension in one direction less than a width of the slot in the vertical column support and a dimension in a perpendicular direction greater than the width of the slot in the vertical column support. The clamp is rotated ninety degrees to allow the head of the clamping piece to enter the column through the slot, then turned back ninety degrees to engage the head with the column before clamping.

In the preferred design, the clamping piece is threaded at the opposite end from the head and the clamping actuator is a knob that is threadedly attached to the clamping piece. A non-circular cross section for the opening in the body piece and a corresponding portion of the clamping piece, having a mating non-circular cross section portion, allows the clamping piece to be non-rotatingly engaged by the body piece.

In one aspect of the invention, the body piece includes a face having a ridge formed thereon for engaging the slot in the vertical column support. The ridge prevents rotation of the body piece relative to the vertical column support. In a related aspect of the invention, the body piece includes a curved face, the curved face having a radius of curvature matching a radius of curvature of the vertical column support. Both the curved face and the ridge act to prevent rotation of the body piece about its own axis and to maintain alignment of the clamp with the vertical support.

In one embodiment of the invention, the body piece is substantially cylindrical. Other cross sections for the body piece, such as rectangular or square may also be used. The clamping knob may also be cylindrical.

In the most highly preferred embodiment of the invention, the body piece is provided with one or more connectors, such as threaded openings that allow a display fixture to be attached to the body piece. The clamp holds the connectors at a predetermined orientation relative to the column, preferably vertical, so that the display fixture also maintains a predetermined orientation.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is an exploded perspective view showing a vertical column support and horizontal supports ready to be attached to the vertical column support with universal clamps for a modular display system according to the present invention.

FIG. 2 is an assembled perspective view of the universal clamp for a modular display system seen in FIG. 1.

FIG. 3 is an exploded perspective view of the universal clamp for a modular display system according to the present invention.

FIG. 4 is an exploded perspective view of a second embodiment of a universal clamp for a modular display system according to the present invention.

DESCRIPTION OF THE PREFERRED EMBODIMENT(S)

In describing the preferred embodiment of the present invention, reference will be made herein to FIGS. 1–4 of the drawings in which like numerals refer to like features of the invention.

FIG. 1 shows a vertical column support 10 of the type used in modular display systems. The column support 10 includes multiple horizontal slots 12, 14, 16, 18 used to attach display fixtures to the column. The horizontal slots are spaced vertically and angularly around the perimeter of the column to allow attachment of the display fixtures at a variety of different heights and angular orientations relative to the column.

FIG. 1 illustrates how the universal clamps 20, 22 of the present invention are used to connect display fixtures, such as horizontal tubes 24 and 26, to the column support 10 at slots 12, 14. The universal clamps shown may be connected to any of the horizontal slots in the column 10 to adjust the height of the horizontal tubes, and may be moved angularly relative to the slot so that the tube has the desired angular orientation.

Although FIG. 1 illustrates only horizontal tube display fixtures, other display fixtures, including lights, shelves and other types of supports may be attached to the column 10.

Once the universal clamp of the invention, such as clamp 20, is connected at the desired height and angle, a tube, such as tube 24, may be attached simply by sliding the tube over the end of the universal clamp. Alternatively, a more secure threaded connection may be made between the fixture and the clamp. Horizontal tube 26 is shown with this type of connection wherein screws 28, 30 are connected to corresponding threaded openings 32, 34 in the upper surface of universal clamp 22. Threaded openings 32, 34 can be seen best in FIGS. 2 and 3.

As described below, the universal clamp of this invention is designed so that the threaded openings 32, 34 are always at the top or bottom surface of the clamp when the clamp is attached to the column. Further, the clamp is designed so that it cannot rotate around its own axis after it is secured to the column. This provides a secure and fixed orientation relative to the column so that shelves and other display fixtures may be attached to a clamp without fear that they will rotate away from the desired orientation relative to vertical.

Referring to FIGS. 2 and 3, the design of the universal clamp 22 can be seen in detail. The universal clamp includes a body 36 having an axial opening 38 that receives a clamping piece 40. The clamping piece 40 includes a threaded end 42 and a head 44 at the opposite end. The head 44 has a width W that is sufficiently narrow to allow the head to be inserted into a horizontal slot in column 10 (such as slots 12, 14, 16, 18 seen in FIG. 1). The head 44 has a height H that is greater than the width of the horizontal slots.

These dimensions W and H allow the clamp seen in FIG. 2, together with the clamping piece 40, to be rotated ninety degrees (about their cylindrical axis) so that the head 44 of clamping piece 40 can be inserted horizontally through a desired horizontal slot into the hollow interior of the column 10. The universal clamp is then rotated back ninety degrees (to the position seen in FIGS. 2 and 3) such that the head 44 is again vertical and is trapped inside the column.

The threaded end 42 of clamping piece 40 is engaged by threaded opening 46 in clamping knob 48. Clamping piece 40 includes a portion having a non-circular cross section, such as the square cross section of the portion 50 that non-rotatably engages opening 38 in piece 36. This allows the clamping knob 48 to be rotated without rotating clamping piece 40 relative to the body 36. This ensures that head 44 will remain in the correct orientation relative to the threaded openings 32 and 34.

Clamping knob 48 acts as a clamping actuator whose function is to draw the head of the clamping piece towards the body piece and clamp the body piece to the vertical column support when the clamping actuator is actuated. In the preferred design shown, this clamping motion is achieved with a threaded opening 46 that engages threads 42 and is actuated by rotating knob 48 to pull head 44 towards end 52 of the body piece 36. This draws the outer surface of the column into flush contact with curved face surface 54. Although a threaded clamping actuator is preferred, those with skill in the art will recognize that other types of clamping actuators may be used, including various types of quick releases that use cams, wedges and the like to draw the clamping piece 40 towards the actuator.

To ensure that piece 36 retains the correct orientation relative to the column 10, face surface 54 is curved with a radius of curvature identical to the radius of curvature of the exterior surface of column 10. This ensures that face 54 is in flush frictional contact with the curved outer surface of column 10 and prevents motion of the clamp relative to the column 10.

To assist in the task of preventing motion of the clamp relative to the column, and particularly to prevent any rotation of the clamp about its own axis, curved face 54 has a ridge 56 formed across it. The ridge 56 engages the horizontal slot at right angles to the head 44. The ridge cooperates with the arcuate face surface 54 to prevent the body piece 36 from rotating around the axis of clamping piece 40 and ensures that threaded openings 32, 34 always remain vertical.

A portion 60 of the clamping piece 40 located near the head 44 has a cross section sufficiently small so that the clamping piece 40 may be easily rotated after it is inserted into the horizontal slot of the column. Preferably, this portion is cylindrical with a diameter approximately equal to the width W of the head 44.

The non-circular cross section portion 50 of the clamping piece cooperates with the non-circular cross section of the interior of the opening 38 to keep the alignment between the head 44 and ridge 56 seen in the drawings. The noncircular cross section portion 50 of the clamping piece may be constructed with other non-circular cross sections such as a triangle.

Alternatively, a pin may be used, such as pin 62 seen in FIG. 4, to maintain alignment between the clamping piece and the body piece. Pin 62 provides a non-circular cross section for a portion of the length of the clamping piece and that portion engages a correspondingly shaped axial opening 64 having a groove 66 that the pin 62 slides in to prevent the clamping piece 40 from rotating.

Another alternative design uses a relatively smaller square cross section portion 50 that extends all the way to the head 44, thereby eliminating smaller diameter portion 60. This is acceptable provided that the diagonal diameter of the smaller square cross section portion is less than the width of the horizontal slot in the column so that the head 44 of the clamping piece may be turned ninety degrees between its insertion orientation and its final clamping orientation. Those with skill in this art may recognize other permutations and variations that may be used. All such variations are suitable so long as the orientation of head 44 relative to body piece 36 is maintained and body piece 36 engages the slot 12 or column 10 to maintain the desired orientation between the body piece and the column.

In the preferred embodiment, pieces 36 and 48 are constructed of injection molded plastic, and piece 40 is constructed of steel or aluminum, however other materials may also be used.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A universal clamp for a modular display system having a vertical column support, the universal clamp comprising:
   a body piece having an opening therein, the opening including a groove;
   an elongated clamping piece extending through the opening in the body piece, the clamping piece being non-rotatingly engaged by the body piece and having threads at one end and an enlarged head at an opposite end thereof, the enlarged head being adapted for connection to a slot in the vertical column support, the enlarged head having a dimension in one direction less than a width of the slot in the vertical column support to permit the enlarged head to enter the slot and a dimension in a perpendicular direction greater than the width of the slot in the vertical column support to permit the enlarged head to bear against an interior of the vertical column support on opposite sides of the slot after the enlarged head is rotated relative to the slot;
   a pin protruding from the elongated clamping piece, the protruding pin engaging the groove in the opening of the body piece to prevent rotation of the clamping piece relative to the body piece; and
   a clamping knob threadedly attached to the clamping piece to draw the enlarged head into secure engagement with the interior of the vertical column support on opposite sides of the slot as the clamping knob is rotated.

2. The universal clamp for a modular display system according to claim 1 wherein the body piece includes a face having a ridge formed thereon for engaging the slot in the vertical column support, the ridge preventing rotation of the body piece relative to the vertical column support.

3. The universal clamp for a modular display system according to claim 1 wherein the body piece includes a curved face, the curved face having a radius of curvature matching a radius of curvature of the vertical column support.

4. The universal clamp for a modular display system according to claim 3 wherein the arcuate surface on the face of the body piece has a ridge formed thereon for engaging the slot in the vertical column support.

5. The universal clamp for a modular display system according to claim 1 wherein the body piece is substantially cylindrical.

6. The universal clamp for a modular display system according to claim 1 wherein the body piece includes a connector for connecting a display fixture to the body piece.

7. The universal clamp for a modular display system according to claim 6 wherein the connector comprises at least one threaded opening.

8. The universal clamp for a modular display system according to claim 7 wherein the at least one threaded opening is located on an upper surface of the body piece.

9. The universal clamp for a modular display system according to claim 1 wherein the clamping knob includes a textured gripping surface.

10. The universal clamp for a modular display system according to claim 1 wherein the body piece is substantially cylindrical and the clamping knob includes a portion that is also substantially cylindrical with a diameter substantially the same as a diameter of the cylindrical body piece.

* * * * *